US012044135B1

(12) United States Patent
Convertini et al.

(10) Patent No.: US 12,044,135 B1
(45) Date of Patent: Jul. 23, 2024

(54) STATOR VANE WITH VARIABLE CENTER OF GRAVITY

(71) Applicant: PRATT & WHITNEY CANADA CORP., Longueuil (CA)

(72) Inventors: Marco Convertini, Vaughan (CA); Piotr Szczesnowicz, Toronto (CA); Ernest Adique, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/502,161

(22) Filed: Nov. 6, 2023

(51) Int. Cl.
*F01D 25/04* (2006.01)
*F01D 9/04* (2006.01)

(52) U.S. Cl.
CPC ............... *F01D 25/04* (2013.01); *F01D 9/04* (2013.01); *F05D 2220/323* (2013.01); *F05D 2240/12* (2013.01); *F05D 2260/96* (2013.01)

(58) Field of Classification Search
CPC ...... F01D 25/04; F01D 9/04; F05D 2220/323; F05D 2240/12; F05D 2260/96
See application file for complete search history.

(56) References Cited

U.S. PATENT DOCUMENTS 6,155,789 A * 12/2000 Mannava ............. C21D 10/005 29/889.7
6,607,359 B2 * 8/2003 von Flotow .............. F01D 5/26 416/500
6,827,551 B1 * 12/2004 Duffy ........................ F01D 5/16 416/500
8,029,240 B2 * 10/2011 Cawthorne ........... B64C 27/008 416/139
8,297,928 B2 * 10/2012 Manfredotti .............. F03D 1/06 416/500
9,371,733 B2 6/2016 Hartung
9,765,625 B2 * 9/2017 Stiehler ...................... F01D 5/10
9,879,551 B2 * 1/2018 Blaney ....................... F01D 5/18
10,041,359 B2 * 8/2018 Brandl ..................... F01D 5/147
10,563,538 B2 * 2/2020 Birnkrant ................ F01D 25/04
11,143,036 B1 * 10/2021 Zhang ...................... F01D 5/225
11,739,645 B2 * 8/2023 Chakrabarti .............. F02C 3/04 60/805
2018/0230818 A1 * 8/2018 Chakrabarti .............. F01D 5/10

FOREIGN PATENT DOCUMENTS

DE 10202995 A1 * 8/2003 ............... F01D 5/26

* cited by examiner

*Primary Examiner* — Jesse S Bogue
(74) *Attorney, Agent, or Firm* — NORTON ROSE FULBRIGHT CANADA LLP

(57) ABSTRACT

A stator assembly for an aircraft engine, has: vanes distributed about a central axis, a vane having: an airfoil extending from a first end to a second end along a span and from a leading edge to a trailing edge along a chord, the airfoil having a pressure side and a suction side opposed to the pressure side; a slot within the airfoil, the slot extending in a direction having a component along the chord, the slot located between the pressure side and the suction side; a port at the leading edge, the port fluidly communicating with the slot and with the gaspath; a mass located within the slot, the mass movable within the slot to shift a center of gravity of the vane in a chordwise direction; and a biasing member biasing the mass in a direction opposite a pressure force generated by the flow of fluid.

20 Claims, 4 Drawing Sheets

STATOR VANE WITH VARIABLE CENTER OF GRAVITY

TECHNICAL FIELD

The application relates generally to aircraft engines and, more particularly, to stator airfoils for such engines.

BACKGROUND

Within the compressor or turbine of an aircraft engine, such as a gas turbine engine, a fluid is typically channelled through circumferential rows of vanes and blades in stages. During some operating conditions, such as varying wind conditions, stall, and so on, high vibratory stress and imbalance may be imparted on the stator vanes. These stress may be more present in variable guide vanes ("VGV" or "VGVs") that are sometimes used within the compressors. The VGV are rotatable such that the angle of attack they define with the incoming flow may be varied. It is therefore desired to mitigate these stresses on the vanes.

SUMMARY

In one aspect, there is provided a stator assembly for an aircraft engine, comprising: vanes circumferentially distributed about a central axis for directing a flow of fluid through a gaspath, a vane of the vanes having: an airfoil extending from a first end to a second end along a span and from a leading edge to a trailing edge along a chord, the airfoil having a pressure side and a suction side opposed to the pressure side; a slot within the airfoil, the slot extending in a direction having a component along the chord, the slot located between the pressure side and the suction side; a port at the leading edge, the port fluidly communicating with the slot and with the gaspath; a mass located within the slot, the mass movable within the slot to shift a center of gravity of the vane in a chordwise direction; and a biasing member biasing the mass in a direction opposite a pressure force generated by the flow of fluid.

The stator assembly may include any of the following features, in any combinations.

In some embodiments, the slot extends from a first slot end to a second slot end located downstream of the first slot end relative to a direction of the flow, the port fluidly connected to the first slot end of the slot via a conduit, the first slot end defining a shoulder to limit displacement of the mass beyond the first slot end towards the port.

In some embodiments, the biasing member includes a spring, the mass located between the port and the spring.

In some embodiments, a weight of the mass is from about 1% to about 15% of a weight of the vane.

In some embodiments, the vane is a variable guide vane rotatable about a spanwise axis extending from the first end to the second end, the mass located rearward of the spanwise axis in all positions of the mass.

In some embodiments, the slot includes a plurality of slots distributed along the span of the vane, each of the plurality of slots including a respective one of a plurality of masses, ports, and biasing members.

In some embodiments, the first end is located radially outwardly of the second end relative to the central axis, the slot closer to the first end than to the second end.

In some embodiments, the mass is a sphere.

In another aspect, there is provide an aircraft engine, comprising: a compressor having stators and rotors, a stator of the stators having vanes circumferentially distributed about a central axis and extending into a gaspath for directing a flow of fluid through the compressor, the vanes being pivotable about respective spanwise axes, a vane of the vanes having: an airfoil extending from a first end to a second end along a span and from a leading edge to a trailing edge along a chord, the vane having a pressure side and a suction side opposed to the pressure side; a slot extending in a direction having a component along the chord, the slot located between the pressure side and the suction side; a port at the leading edge, the port fluidly communicating with the slot and the gaspath; a mass located within the slot, the mass movable within the slot to shift a center of gravity of the vane in a chordwise direction; and means for resisting a movement of the mass caused by a pressure force generated by the fluid admitted through the port.

The aircraft engine may include any of the following features, in any combinations.

In some embodiments, the slot extends from a first slot end to a second slot end located downstream of the first slot end relative to a direction of the flow, the port fluidly connected to the first slot end of the slot via a conduit, the first slot end defining a shoulder to limit displacement of the mass beyond the first slot end towards the port.

In some embodiments, the means is a spring, the mass located between the port and the spring.

In some embodiments, a weight of the mass is from about 1% to about 15% of a weight of the vane.

In some embodiments, the slot includes a plurality of slots distributed along the span of the vane, each of the plurality of slots including a respective one of a plurality of masses, ports, and biasing members.

In some embodiments, the first end is located radially outwardly of the second end relative to the central axis, the slot closer to the first end than to the second end.

In some embodiments, the mass is a sphere.

In yet another aspect, there is provided a method for mitigating one or more of vibratory stress and imbalance caused by a flow of fluid on a vane of a stator of an aircraft engine, the vane having a mass movable within a chordwise slot defined within a thickness of the vane, the method comprising: directing a portion of the flow against the mass contained within the chordwise slot; and shifting a center of gravity of the vane along a chordwise direction with a stagnation pressure of the flow moving the mass within the slot.

The method may include any of the following features, in any combinations.

In some embodiments, the method includes exerting a force against the mass in a direction opposite that of the flow.

In some embodiments, the exerting of the force includes opposing movement of the mass towards a trailing edge with a biasing member engaged to the mass.

In some embodiments, the moving of the mass includes moving the mass having a weight ranging from about 1% to about 15% of a weight of the vane.

In some embodiments, the shifting of the center of gravity includes moving a plurality of masses by exposing the plurality of masses to the stagnation pressure, the plurality of masses located within respective chordwise slots.

BRIEF DESCRIPTION OF THE DRAWINGS

Reference is now made to the accompanying figures in which.

DETAILED DESCRIPTION

The following disclosure relates generally to gas turbine engines, and in some aspects to assemblies including one or more struts and variable orientation guide vanes as may be present in a compressor or turbine section of a gas turbine engine. In some embodiments, the assemblies and methods disclosed herein may promote better performance of gas turbine engines, such as by improving flow conditions in the compressor section in some operating conditions, improving the operable range of the compressor, reducing energy losses and aerodynamic loading on rotors.

Although the below description focuses on variable guide vanes, the principles of the present disclosure are applicable to any stators (e.g., compressor stator, turbine stator, fan stator, etc) of an aircraft engine.

Figure 1:
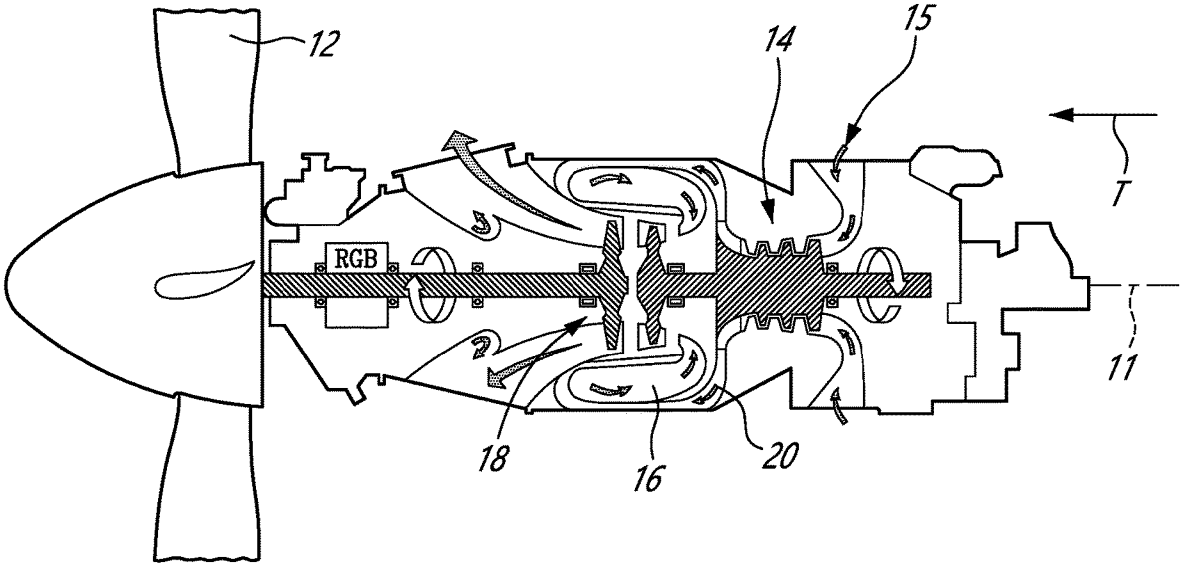
FIG. 1 is a cross-sectional view of an aircraft engine depicted as a gas turbine engine.

FIG. 1 illustrates an aircraft engine depicted as a gas turbine engine 10 (in this case, a turboprop) of a type preferably provided for use in subsonic flight, and in driving engagement with a rotatable load, which is depicted as a propeller 12. The gas turbine engine 10 has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the annular gaspath 20, which may also be a central axis of gas turbine engine 10. The gas turbine engine 10 is depicted as a reverse-flow engine in which the air flows in the annular gaspath 20 from a rear of the gas turbine engine 10 to a front of the gas turbine engine 10, relative to a direction of travel T of the gas turbine engine 10. This is opposite than a through-flow engine in which the air flows within the gaspath in a direction opposite the direction of travel T, from the front of the engine towards the rear of the gas turbine engine 10. The principles of the present disclosure can be applied to both reverse-flow and through-flow engines and to any other gas turbine engines, such as a turbofan engine and a turboprop engine.

Figure 2:
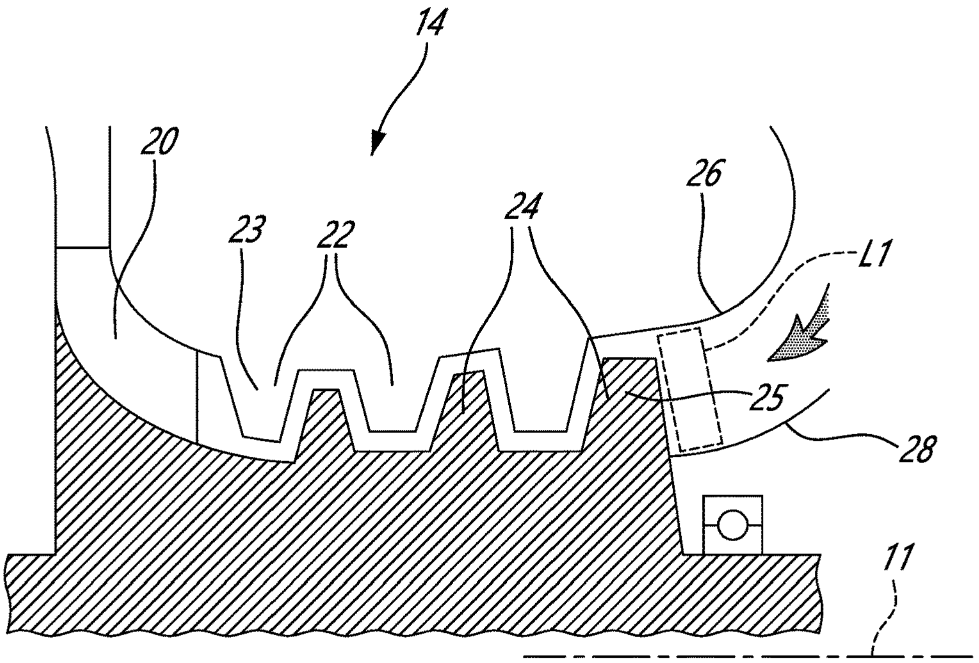
FIG. 2 is an enlarged view of a portion of FIG. 1.

Referring now to FIG. 2, an enlarged view of a portion of the compressor section 14 is shown. The compressor section 14 includes a plurality of stages, namely three in the embodiment shown although more or less than three stages is contemplated, each stage including a stator 22 and a rotor 24. The rotors 24 are rotatable relative to the stators 22 about the central axis 11. Each of the stators 22 includes a plurality of vanes 23 circumferentially distributed about the central axis 11 and extending into the annular gaspath 20. Each of the rotors 24 also includes a plurality of blades 25 circumferentially distributed around the central axis 11 and extending into the annular gaspath 20, the rotors 24 and thus the blades 25 thereof rotating about the central axis 11. As will be seen in further detail below, at least one of the stators 22 includes vanes 23 which are variable guide vanes (VGVs) and thus includes a variable guide vane assembly as will be described.

In the context of the present disclosure, the expression "vane" denotes structures that are non-rotatable relative to the central axis 11 of the gas turbine engine 10 (e.g., an airfoil of a stator) whereas the expression "blade" denotes structures that are rotatable about the central axis 11 (i.e., an airfoil of a rotor).

In the depicted embodiment, the annular gaspath 20 is defined radially between an outer wall or casing 26 and an inner wall or casing 28. The vanes 23 and the blades 25 extend radially relative to the central axis 11 between the outer and inner casings 26, 28. "Extending radially" as used herein does not necessarily imply extending perfectly radially along a ray perfectly perpendicular to the central axis 11, but is intended to encompass a direction of extension that has a radial component relative to the central axis 11. The vanes 23 can be fixed orientation or variable orientation guide vanes (referred hereinafter as VGVs). Examples of rotors include fans, compressor rotors (e.g. impellers), and turbine rotors (e.g. those downstream of the combustion chamber). Other orientations of the vanes (e.g., axial) are contemplated.

Although illustrated as a turboprop engine, the gas turbine engine 10 may alternatively be another type of engine, for example a turbofan engine or a turboshaft engine, also generally comprising in serial flow communication a compressor section, a combustor, and a turbine section, and a fan through which ambient air is propelled.

Figure 3:
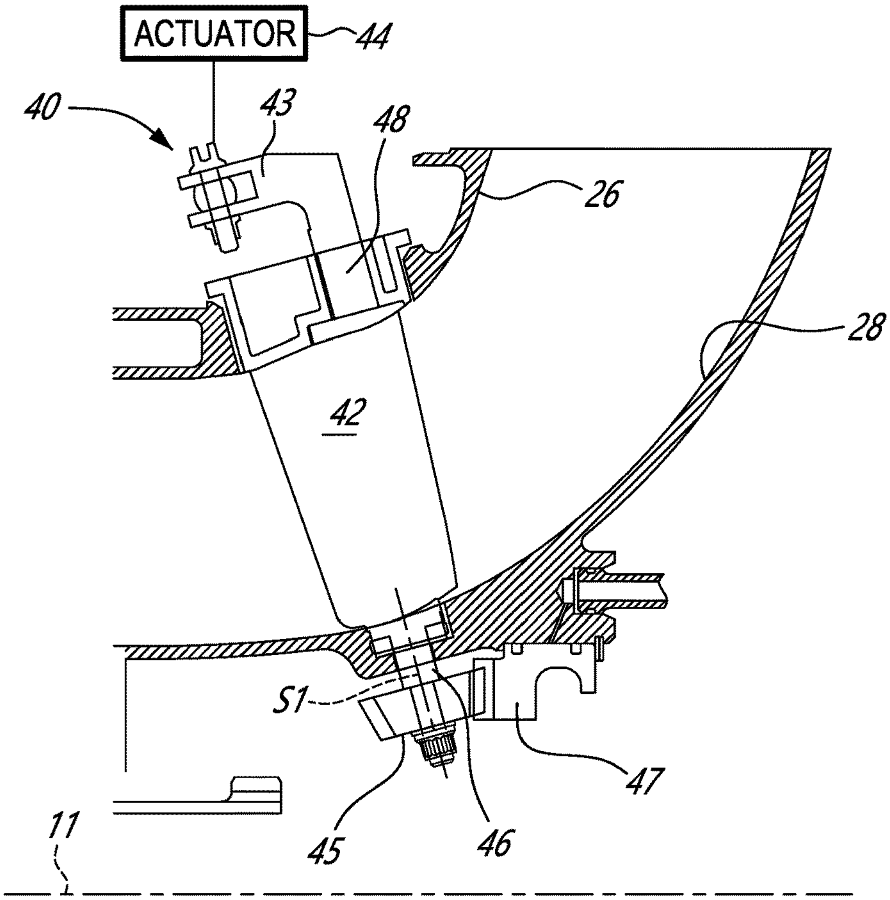
FIG. 3 is a cross-sectional view illustrating a variable guide vane assembly of the aircraft engine of FIG. 1.

Referring to FIG. 3, an example of a variable guide vane (VGV) assembly of a stator 22 of the gas turbine engine 10 is shown at 40. Any of the stators 22 of the compressor section 14 depicted in FIG. 2 may be embodied as a variable guide vane (VGV) assembly 40. It will be appreciated that, in some cases, the VGV assembly 40 may be used as a stator of the turbine section 18 of the gas turbine engine 10 without departing from the scope of the present disclosure. The VGV assembly 40 may be located at an upstream most location L1 (FIG. 2) of the compressor section 14. That is, the VGV assembly 40 may be a variable inlet guide vane assembly.

The VGV assembly 40 includes a plurality of guide vanes 42 circumferentially distributed about the central axis 11 and extending radially between the inner casing 28 and the outer casing 26. In the present embodiment, the guide vanes 42 are rotatably supported at both of their ends by the inner casing 28 and the outer casing 26. Particularly, each of the guide vanes 42 has an airfoil having a leading edge and a trailing edge both extending along a span of the airfoil. Each of the guide vanes 42 has an inner stem 46, also referred to as an inner shaft portion, secured to an inner end of the airfoil and an outer stem 48, also referred to as an outer shaft portion, secured to an outer end of the airfoil. The guide vanes 42 are rotatable about respective spanwise axes S1. One of the guide vanes 42, which may be referred to as a master guide vane, has its outer stem 48 engaged by a vane arm 43, which is itself drivingly engaged by an actuator 44 for pivoting the master vane about it spanwise axis S1. In the present embodiment, the vanes have gears 45 secured to the inner stems 46. The gears 45 are meshed with a unison gear 47, which is rollingly engaged to the inner casing 28. Upon rotation of the master vane about its spanwise axis S1 via the actuator 44 engaged to the vane arm 43, the gear 45 of the master vane rotates thereby induces rotation of the unison gear 47, which extends annularly around the central axis 11. Rotation of the unison gear 47 induces rotation of each of the other gears 45 and, consequently, of the other guide vanes 42, which may be referred to as slave vanes, about their respective spanwise axes S1. Therefore, the unison gear 47 ensures that the rotation of all the guide vanes 42 is synchronized. Any suitable means for rotating the guide vanes 42 about their respective spanwise axes S1 are contemplated. The unison gear 47 may be located radially outwardly of the outer casing 26 in another embodiment. The unison gear may be replaced by any suitable unison member without departing from the scope of the present disclosure.

The variable guide vane assembly 40 is used to properly orient the flow before it meets blades of a rotor located downstream of the variable guide vane assembly 40. Put differently, the flow is redirected by the variable guide vane assembly 40 so that an incidence angle between the flow and the downstream blades is optimal. This incidence angle varies with operating parameters of the gas turbine engine 10. Namely, flight parameters, such as altitude, airspeed, air temperature, and engine parameters, such as power and speed, are expected to influence the incidence angle at which the flow should meet the blades.

However, in some operating conditions, such as varying wind conditions, aerodynamic forces are high on the vanes. This may cause high vibratory stress and imbalance on the vanes. The guide vanes 42 of the present disclosure may at least partially alleviate this drawback. It is to be noted that the principles of the present disclosure, although described in relation with variable guide vanes, may be applicable to any stator of the gas turbine engine 10.

Figure 4:
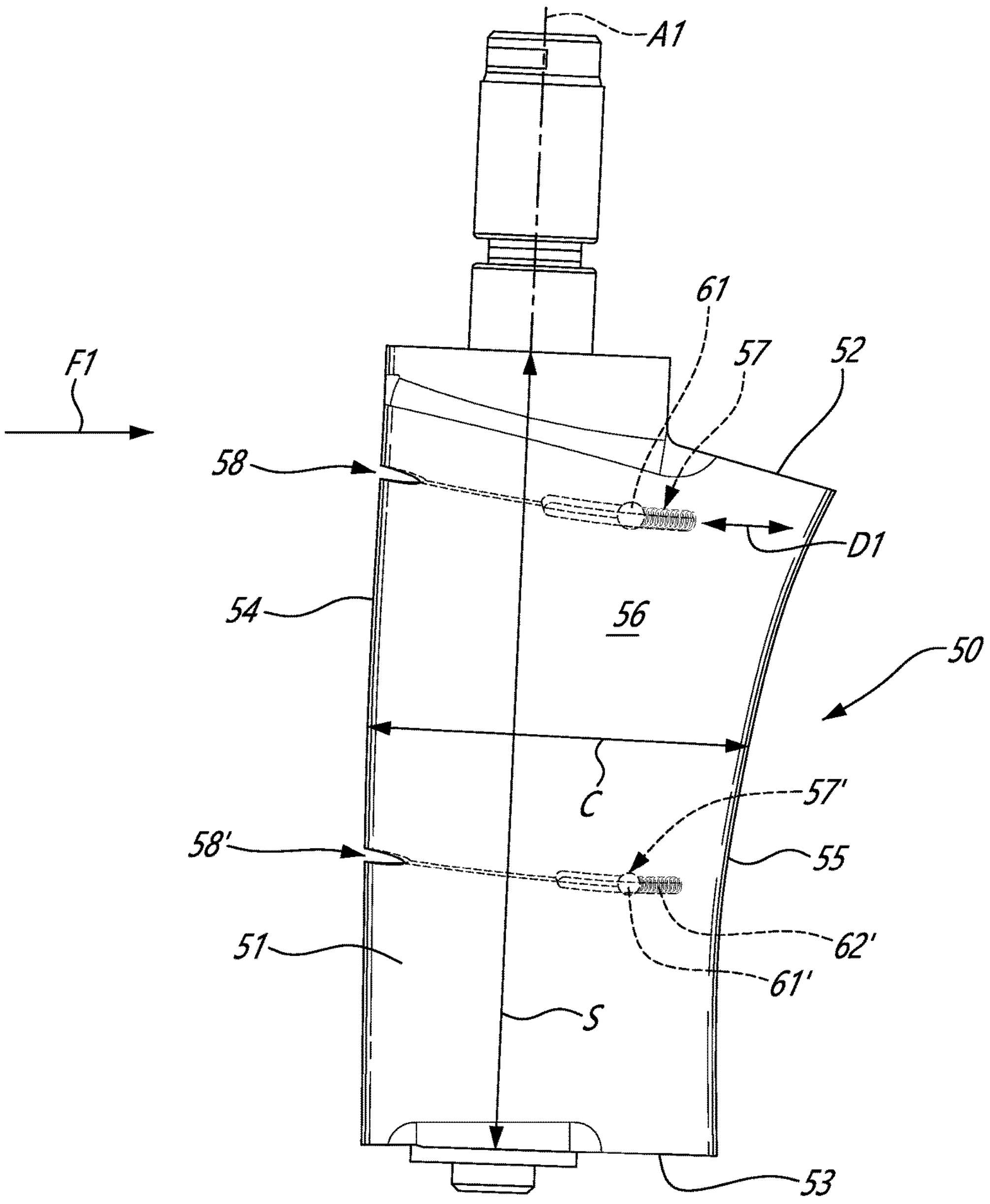
FIG. 4 is a side view of a vane of the variable guide vane assembly of FIG. 3.
Figure 5:
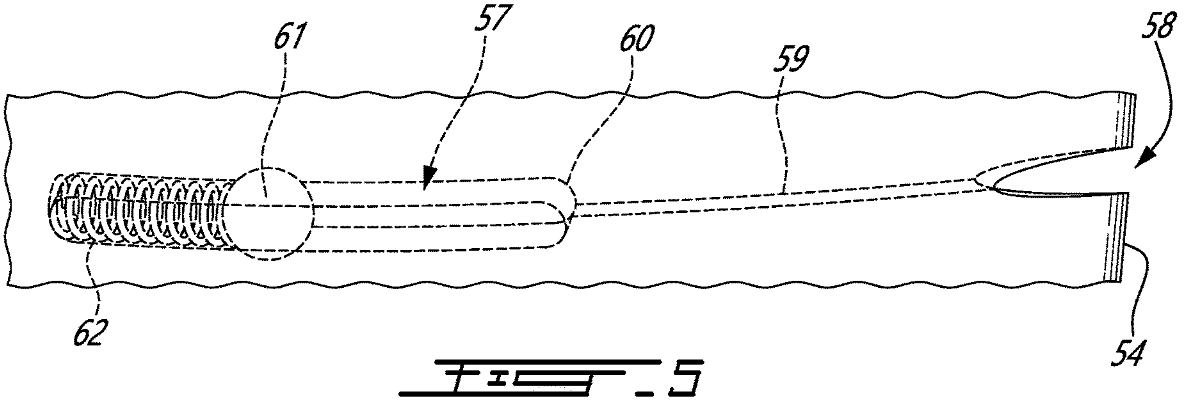
FIG. 5 is an enlarged view of a portion of FIG. 4.

Referring now to FIGS. 4-5, a vane, which may be used with the variable guide vane assembly 40, is shown below at 50. Although the description below uses the singular form, features of the vane 50 may apply to all of the vanes 50 of a respective stator. The vane 50 includes an airfoil 51 configured to change a direction of a flow flowing around it. The vane 50 extends from a first end 52, which may be a radially-outer end, to a second end 53, which may be a radially-inner end, along a span S. The airfoil 51 extends along a chord C from a leading edge 54 to a trailing edge 55. The airfoil 51 has a pressure side 56 and an opposed suction side.

Referring more particularly to FIG. 5, in the depicted embodiment, the vane 50 has a slot 57 within the airfoil 51. In other words, the slot 57 is located between the pressure side 56 and the suction side of the airfoil 51. The slot 57 is contained within a thickness of the airfoil 51. The slot 57 extends from a first slot end to a second slot end in a direction D1 (FIG. 4) having a component along the chord C. The second slot end is close-ended. Put differently, there may be no outlet for air entering the slot 57. The slot 57 may be devoid of a fluid outlet. The direction D1 may be solely a chordwise direction along the chord C. A component of the direction D1 of the slot 57 along the chord C is greater than a component of the direction D1 of the slot 57 along the span S. In other words, the slot 57 is more chordwise than spanwise. The first slot end is closer to the leading edge 54 than the trailing edge 55 while the second slot end is closer to the trailing edge 55 than the leading edge 54. In the depicted embodiment, the slot 57 is entirely located rearward of a spanwise axis A1 of the vane 50.

The slot 57 communicates with an environment outside the slot 57, in this case with the annular gaspath 20 (FIG. 1) via a port 58 defined at the leading edge 54 of the airfoil 51. The port 58 fluidly communicates with the slot 57 via a conduit 59 located within the airfoil 51 between the pressure and suction sides and within the thickness of the airfoil 51. In this embodiment, a cross-sectional area of the conduit 59 is less than that of the slot 57 to define a shoulder 60 at an intersection between the conduit 59 and the slot 57. The shoulder 60 is located at the first slot end of the slot 57.

A mass 61 is located within the slot 57. The mass 61 is movable within the slot 57 towards and away from the leading edge 54. The mass 61 moves within the slot 57 to shift a position of a center of gravity of the vane 50 in a chordwise direction. The mass 61 may have a weight ranging from about 0.5% to about 70% of a weight of the vane 50 (excluding the mass 61), preferably from about 1% to about 15% of the weight of the vane 50 (excluding the mass 61). The mass 61 is depicted here as a sphere, but may alternatively be a cylinder or any other suitable shape permitting the mass 61 to slide within the slot 57. The mass 61 may be located rearward of the spanwise axis A1 in all positions of the mass 61 within the slot 57. The slot 57 may be located closer to the radially-outer end of the airfoil 51 than the radially-inner end. Other configurations are contemplated.

Many possible ways are envisaged for inserting the mass 61 into the vane 50. For instance, the vane 50 may be bored from its leading edge. The mass 61 may be inserted into the bore, and the bore may be closed with metal injection molding, additive manufacturing, and so on. In some embodiments, a plug may be welded inside the bore. The vane 50 may be manufactured in two halves each defining a portion of the slot. The mass 61 may be inserted in the slot and the two halves may then be secured (e.g., brazed, welded, etc) to one another. Any other suitable ways of manufacturing the vane 50 with the mass 61 are contemplated without departing from the scope of the present disclosure.

A biasing member 62 is engageable with the mass 61 to resist movements of the mass 61 towards the second slot end and towards the trailing edge 55. The biasing member 62 exerts a force on the mass 61 in a direction opposite a pressure force generated by the flow F1 on the mass 61. In this configuration, the flow F1 causes the mass 61 to move towards the trailing edge 55. Alternatively, the flow F1 may cause the mass 61 to move towards the leading edge 54. This may be achieved by having the conduit 59 defining a U-shape. In the present embodiment, the biasing member 62 exerts a force on the mass 61 in a direction towards the port 58. In other words, the biasing member 62 exerts a force on the mass 61 to push the mass 61 towards the port 58. The force is calibrated such that the mass 61, when exposed to a flow F1 entering the slot 57 via the port 58, is able to deform the biasing member 62 when a stagnation pressure of the flow F1 is greater than a given threshold. The higher is the stagnation pressure, the more the mass 61 will move towards the trailing edge 55 thereby shifting the center of gravity of the vane 50 in a downstream direction relative to the flow F1 in the annular gaspath 20.

A position of the mass 61 within the slot 57 varies with the stagnation pressure of the flow F1 impinging against the mass 61. In other words, a distance between the mass 61 and the leading edge 54 increases with an increase in the stagnation pressure. The biasing member 62 may be calibrated such that the mass 61 stays substantially at a baseline position until the stagnation pressure reaches a given threshold. As the stagnation pressure increases beyond that threshold, the distance between the mass 61 and the leading edge 54 increases. A force generated by the biasing member 62 may vary linearly with a displacement of the mass 61. In some embodiments, the force generated by the biasing member 62 may increase non-linearly (e.g., exponential, square, cubic, etc.) as the mass 61 moves towards the trailing edge 55.

In the embodiment shown, the biasing member 62 is a spring located between the second slot end of the slot 57 and the mass 61. The spring is therefore located downstream of the mass 61. The biasing member 62 may alternatively be an elastomeric member, a pneumatic system and so on. The mass 61 may be engaged by any suitable means operable to resist a movement of the mass 61 against the fluid pressure force. These means may include, for instance, a spring, an elastomeric member, a chamber filled with a gas and sealed by the mass 61 such that movement of the mass 61 compresses the gas to resist movements of the mass 61, an elastic band attached to the mass 61 and to a wall of the airfoil 51, and so on.

As shown in FIG. 1, the slot 57 may include a plurality of slots 57, 57' distributed along the span S of the vane 50. Each of the plurality of slots 57, 57' include a respective one of a plurality of masses 61, 61', ports 58, 58', and biasing members 62, 62'. The slots 57, 57' may have different lengths and may be axially offset along the chordwise direction with only portions of the slots axially overlapping each other. In other words, some slots may be located closer to the leading edge whereas some other slots may be located closer to the trailing edge. The masses 61, 61' may have different sizes and/or weights.

Figure 6:
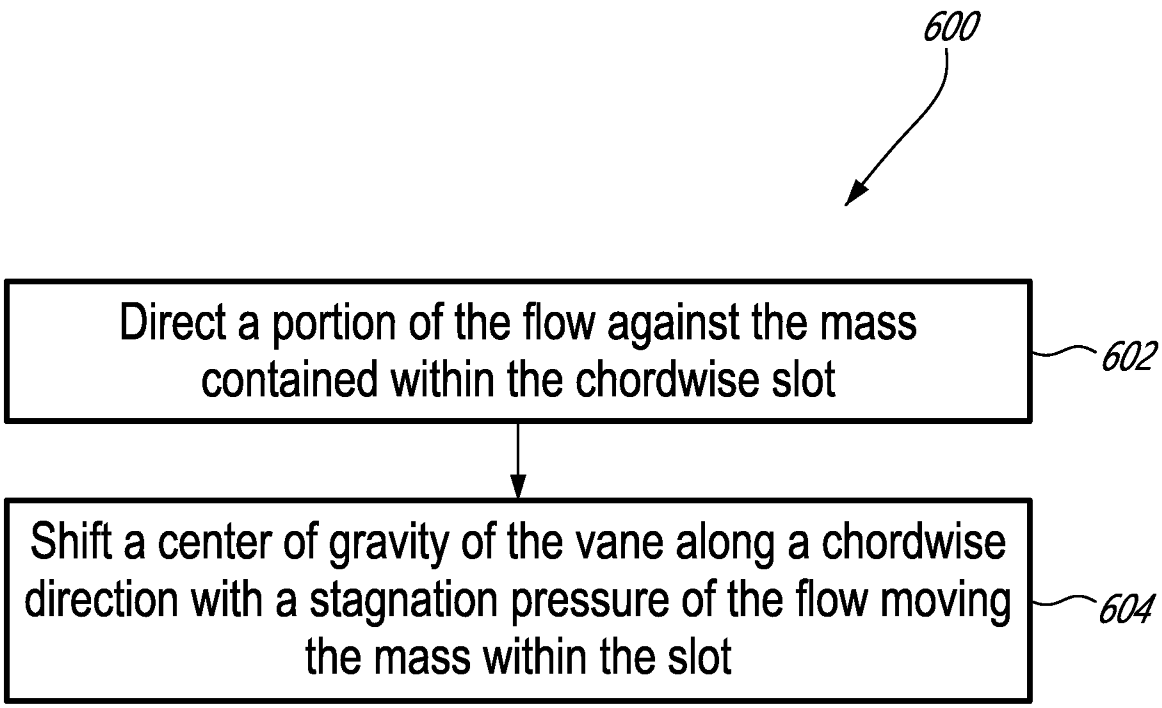
FIG. 6 is a flowchart illustrating steps of a method of mitigating vibratory stress and imbalance caused by a flow on the vane of FIG. 4.

Referring now to FIG. 6, a method for mitigating one or more of vibratory stress and imbalance caused by the flow F1 on the vane 50 is shown at 600. The method 600 includes directing a portion of the flow F1 against the mass 61 contained within the slot 57 at 602; and shifting a center of gravity of the vane 50 along a chordwise direction with a stagnation pressure of the flow F1 moving the mass 61 within the slot 57.

The method 600 comprises exerting a force against the mass 61 in a direction opposite that of the flow F1. The exerting of the force includes opposing movement of the mass 61 towards the trailing edge 55 with the biasing member 62 engaged to the mass 61.

In some embodiments, the shifting of the center of gravity at 604 includes moving a plurality of masses towards the trailing edge 55 by exposing the plurality of masses to the stagnation pressure of the flow F1. The plurality of masses are located within respective chordwise slots.

The vane 50 as disclosed herein and comprising one or more (e.g., 2, 3, etc) masses movable with chordwise slots may shift the center of gravity of the vane 50 when a speed of an incoming flow is higher than a given threshold. The speed increase translates into an increase in stagnation pressure that increases a force perceived by the masse(s) to push said mass(s) within their respective slots. Shifting the center of gravity may at least partially alleviate the vibratory stresses and imbalances described herein above.

In the context of the present disclosure, the expression "about" implies variations of plus or minus 10%.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A stator assembly for an aircraft engine, comprising:

vanes circumferentially distributed about a central axis for directing a flow of fluid through a gaspath, a vane of the vanes having:

an airfoil extending from a first end to a second end along a span and from a leading edge to a trailing edge along a chord, the airfoil having a pressure side and a suction side opposed to the pressure side;

a slot within the airfoil, the slot extending in a direction having a component along the chord, the slot located between the pressure side and the suction side;

a port at the leading edge, the port fluidly communicating with the slot and with the gaspath;

a mass located within the slot, the mass movable within the slot to shift a center of gravity of the vane in a chordwise direction; and a biasing member biasing the mass in a direction opposite a pressure force generated by the flow of fluid.

2. The stator assembly of claim 1, wherein the slot extends from a first slot end to a second slot end located downstream of the first slot end relative to a direction of the flow, the port fluidly connected to the first slot end of the slot via a conduit, the first slot end defining a shoulder to limit displacement of the mass beyond the first slot end towards the port.

3. The stator assembly of claim 1, wherein the biasing member includes a spring, the mass located between the port and the spring.

4. The stator assembly of claim 1, wherein a weight of the mass is from about 1% to about 15% of a weight of the vane.

5. The stator assembly of claim 1, wherein the vane is a variable guide vane rotatable about a spanwise axis extending from the first end to the second end, the mass located rearward of the spanwise axis in all positions of the mass.

6. The stator assembly of claim 1, wherein the slot includes a plurality of slots distributed along the span of the vane, each of the plurality of slots including a respective one of a plurality of masses, ports, and biasing members.

7. The stator assembly of claim 1, wherein the first end is located radially outwardly of the second end relative to the central axis, the slot closer to the first end than to the second end.

8. The stator assembly of claim 1, wherein the mass is a sphere.

9. An aircraft engine, comprising:

a compressor having stators and rotors, a stator of the stators having vanes circumferentially distributed about a central axis and extending into a gaspath for directing a flow of fluid through the compressor, the vanes being pivotable about respective spanwise axes, a vane of the vanes having:

an airfoil extending from a first end to a second end along a span and from a leading edge to a trailing edge along a chord, the vane having a pressure side and a suction side opposed to the pressure side;

a slot extending in a direction having a component along the chord, the slot located between the pressure side and the suction side;

a port at the leading edge, the port fluidly communicating with the slot and the gaspath;

a mass located within the slot, the mass movable within the slot to shift a center of gravity of the vane in a chordwise direction; and means for resisting a movement of the mass caused by a pressure force generated by the fluid admitted through the port.

10. The aircraft engine of claim 9, wherein the slot extends from a first slot end to a second slot end located downstream of the first slot end relative to a direction of the flow, the port fluidly connected to the first slot end of the slot via a conduit, the first slot end defining a shoulder to limit displacement of the mass beyond the first slot end towards the port.

11. The aircraft engine of claim 9, wherein the means is a spring, the mass located between the port and the spring.

12. The aircraft engine of claim 9, wherein a weight of the mass is from about 1% to about 15% of a weight of the vane.

13. The aircraft engine of claim 9, wherein the slot includes a plurality of slots distributed along the span of the vane, each of the plurality of slots including a respective one of a plurality of masses, ports, and biasing members.

14. The aircraft engine of claim 9, wherein the first end is located radially outwardly of the second end relative to the central axis, the slot closer to the first end than to the second end.

15. The aircraft engine of claim 9, wherein the mass is a sphere.

16. A method for mitigating one or more of vibratory stress and imbalance caused by a flow of fluid on a vane of a stator of an aircraft engine, the vane having a mass movable within a chordwise slot defined within a thickness of the vane, the method comprising:

directing a portion of the flow against the mass contained within the chordwise slot; and shifting a center of gravity of the vane along a chordwise direction with a stagnation pressure of the flow moving the mass within the slot.

17. The method of claim 16, comprising exerting a force against the mass in a direction opposite that of the flow.

18. The method of claim 17, wherein the exerting of the force includes opposing movement of the mass towards a trailing edge with a biasing member engaged to the mass.

19. The method of claim 18, wherein the moving of the mass includes moving the mass having a weight ranging from about 1% to about 15% of a weight of the vane.

20. The method of claim 16, wherein the shifting of the center of gravity includes moving a plurality of masses by exposing the plurality of masses to the stagnation pressure, the plurality of masses located within respective chordwise slots.

* * * * *